(12) United States Patent
Olijnyk

(10) Patent No.: US 7,235,896 B2
(45) Date of Patent: Jun. 26, 2007

(54) MULTI-FUNCTION MIRROR CONTROL SWITCH

(75) Inventor: Mark Olijnyk, Hallett Cove (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 491 days.

(21) Appl. No.: 10/496,288

(22) PCT Filed: Nov. 25, 2002

(86) PCT No.: PCT/AU02/01580

§ 371 (c)(1),
(2), (4) Date: May 21, 2004

(87) PCT Pub. No.: WO03/046937

PCT Pub. Date: Jun. 5, 2003

(65) Prior Publication Data

US 2005/0006955 A1    Jan. 13, 2005

(30) Foreign Application Priority Data

Nov. 26, 2001 (AU) .................................... PR9060

(51) Int. Cl.
*B60L 1/00* (2006.01)

(52) U.S. Cl. .................................................. 307/9.1

(58) Field of Classification Search ........... 307/9.1, 307/10.1
See application file for complete search history.

(56) References Cited

U.S. PATENT DOCUMENTS

| 4,310,320 A | 1/1982 | Pitchford |
| 5,233,228 A * | 8/1993 | Krieg ................... 307/10.1 |
| 6,154,328 A | 11/2000 | Welsch et al. |
| 6,273,576 B2 * | 8/2001 | Galicia .................. 359/871 |

FOREIGN PATENT DOCUMENTS

| FR | 2685266 | 12/1992 |
| JP | 60050048 | 3/1985 |

* cited by examiner

*Primary Examiner*—Robert L. DeBeradinis

(57) ABSTRACT

A method for extending the functionality of a traditional vehicle mirror control switch to make use of a normally unused third state of the switch, to allow integration of extra mirror function operations such as powerfold and power telescoping. The method allows for reduced manufacturing costs and time. A modified switch arrangement is also disclosed.

11 Claims, 3 Drawing Sheets

MULTI-FUNCTION MIRROR CONTROL SWITCH

This application is a National Stage of International Application No. PCT/AU02/01580, filed Nov. 25, 2002, which claims the priority of Australian Patent Application Serial No. PR 9060, filed Nov. 26, 2001.

TECHNICAL FIELD

This invention relates to control switches for controlling multiple functions of devices, particularly mirrors attached to vehicles.

BACKGROUND TO THE INVENTION

Vehicles including cars and trucks have external or "wing" mirror assemblies disposed on both sides of the vehicle to allow the driver to view areas to the side of and behind the vehicle. Most modern vehicles have means by which the position of these mirrors can be controlled remotely. Generally, the control is conducted by one or more switches located within the cabin space of the vehicle, easily accessible by the driver.

The various types of functions that may be performed by such mirror assemblies include mirror face adjustment, a telescoping function to allow the mirror face to be extended further away from the vehicle to increase the viewing range, and a power fold function which allows the mirror to be folded to the side of the vehicle to effectively narrow the width of the vehicle and to "park" the mirror.

To date, the latter two functions, ie the telescopic function and the power fold function, operate on both left and right hand mirrors simultaneously, and it is not possible to control one or other of the mirrors independently. This is a disadvantage especially for truck, MPV or four wheel drive type mirrors, where large reductions in vehicle width are achieved by operating one side only. Many four wheel drive drivers when operating vehicles on tight clearance tracks through vegetated areas will fold the passenger's mirror in board and leave the driver's side deployed, where it is easier to judge clearances to the vegetation and still maintain rear vision from that mirror. To do this, it is currently necessary for the driver to manually position the mirrors as required.

Furthermore, independent positioning of telescoped mirrors provides the driver with more flexibility as to the position to refine the driver's preferred field of view and clearance requirements.

While it is possible to add additional switches to a switching arrangement to provide the extra functionality, this adds to the costs and complexity of producing a vehicle with the enhanced functionality.

Accordingly, it is an object of the present invention to provide a simple means of controlling certain operations of mirrors independently of each other, while minimising increased cost and complexity in producing a vehicle with these enhanced features.

SUMMARY OF THE INVENTION

According to a first aspect of the present invention, there is provided a switch arrangement including a selector switch and at least one operation control switch, said operation control switch controlling the operation of at least two devices, wherein said selector switch can assume at least three states, where in a first state, one of said at least two devices is controlled by said operation control switch, in a second state another of said at least two devices is controlled by said operation control switch, and in a third state, all of said at least two devices are controlled by said operation control switch.

Preferably, said at least two devices are external vehicle mirrors, one each of which is disposed on opposite sides of a vehicle.

Preferably, said operation control switch controls a power telescope function of the mirrors. Alternatively, said operation control switch controls a powerfold function of the mirrors.

Advantageously, the at least one operation controller will include both powerfold and telescope controllers.

According to a second aspect of the present invention, there is provided a method of extending the functionality of a traditional vehicle mirror control switch arrangement having a mirror selector switch capable of assuming at least three states, a first state selecting a first mirror, a second state selecting a second mirror and third state (neutral state) not selecting either mirror, said method including operationally connecting at least one operation control switch to the selector switch and replacing the neutral state with the function of selecting all mirrors.

Preferably, the at least one operation control switch will be a powerfold control switch.

Alternatively, the at least one operation control switch will be a power telescope control switch.

Optionally, the at least one operation control switch will be both powerfold and power telescope control switches.

Preferably, a mirror orientation control switch will be included, but will be locked out in the third state.

BRIEF DESCRIPTION OF THE DRAWINGS

The invention will now be described in more detail with reference to the following drawings in which.

DETAILED DESCRIPTION OF THE PREFERRED EMBODIMENT

Figure 1:
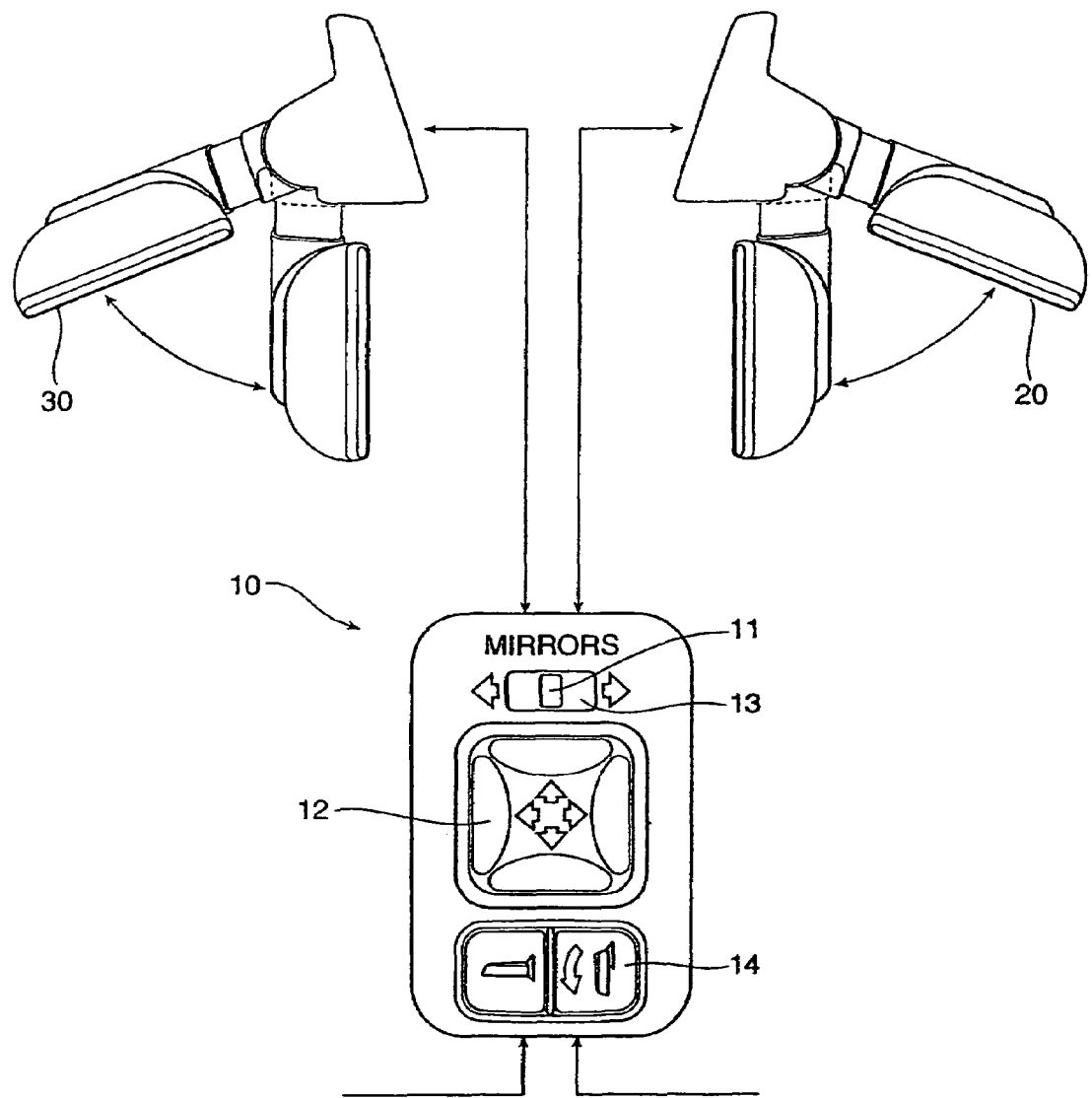
FIG. 1 shows a typical prior art switch arrangement.

In current systems, the typical switch arrangement used to control the operation of vehicle mirrors is as shown in FIG. 1. Most modern cars will have electronic mirror adjustment controls disposed on a switch pad 10 with a selector switch 11 and operation control switch 12. To set the position of the right mirror 20, switch 11 is moved from a central neutral position to the right hand side of selector switch bay 13. This selects right hand mirror 20 and causes the mirror face of right hand mirror 20 to be adjusted in accordance with operation control switch 12. When the adjustment is complete, switch 11 is returned to the neutral position in switch bay 13. To adjust the position of left hand mirror 30, switch 11 is moved to the left hand side of switch bay 13 to select left hand mirror 30 and the position of the mirror face of left hand mirror 30 is adjusted in accordance with operation control switch 12. Upon completion of this adjustment, switch 11 is returned to the neutral position in the centre of switch bay 13 as shown in FIG. 1.

Figure 3:
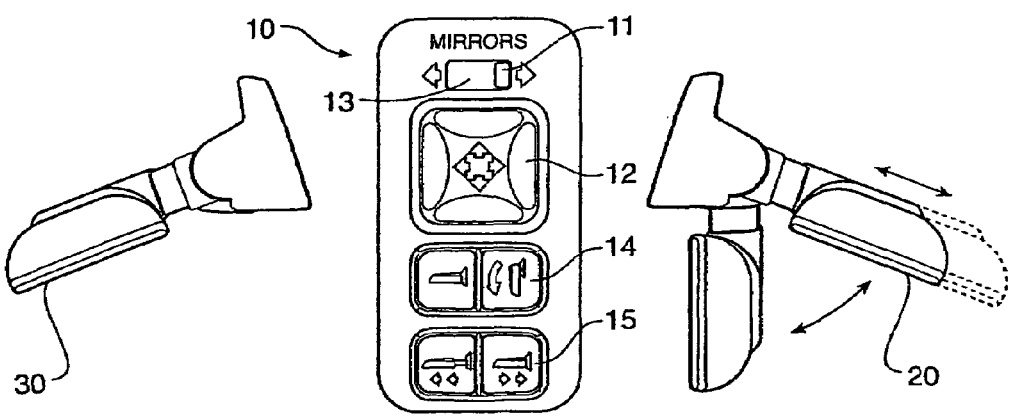
FIG. 3 shows a switch arrangement according to the present invention for controlling the function of one of the mirrors independently.
Figure 4:
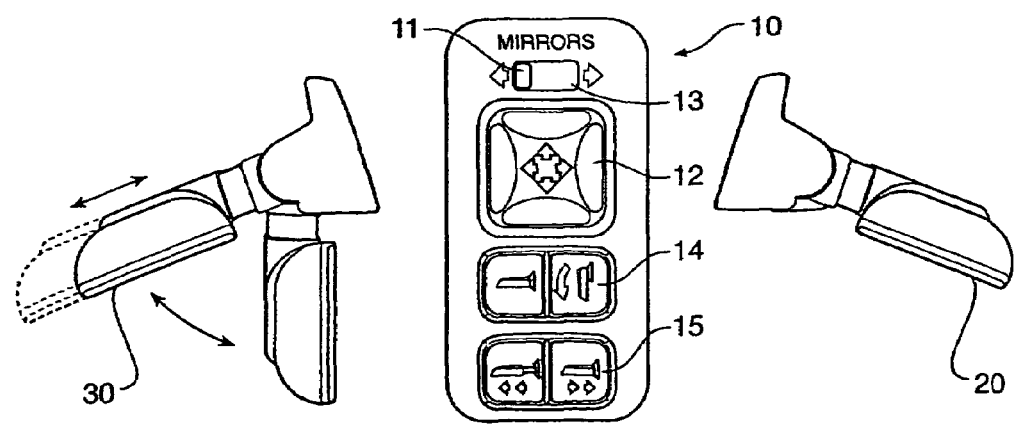
FIG. 4 shows a switch arrangement according to the present invention for controlling the function of the other of the mirrors independently.

For vehicles having a power telescope function or powerfold function (as shown in FIG. 1), there is an additional control switch 14 which works independently of switches 11 and 12 and is dedicated to actuating the powerfold function of both mirrors 20 and 30. There is no mirror selector butt available in current vehicles and it is only possible to fold mirrors 20 and 30 in or out together. A situation applies for the telescoping function. Of course in some vehicles, the powerfold switch 14 in FIG. 1 will be replaced by a power telescope switch 15. For vehicles having both power fold and power telescoping functions, the switch arrangement appears as is shown in FIGS. 2 to 4.

According to the present invention, the control circuitry is rearranged to take advantage of the previously unused "neutral" position of selector switch 11 to increase the functionality of switch pad 10. In essence, the traditionally neutral position of selector switch 11 is allocated the function of selecting both mirrors 20 and 30 simultaneously. This allows mirrors 20 and 30 to be operated simultaneously, or individually as required and of course to perform the functions of the function operator switches 14 or 15 as required.

Figure 2:
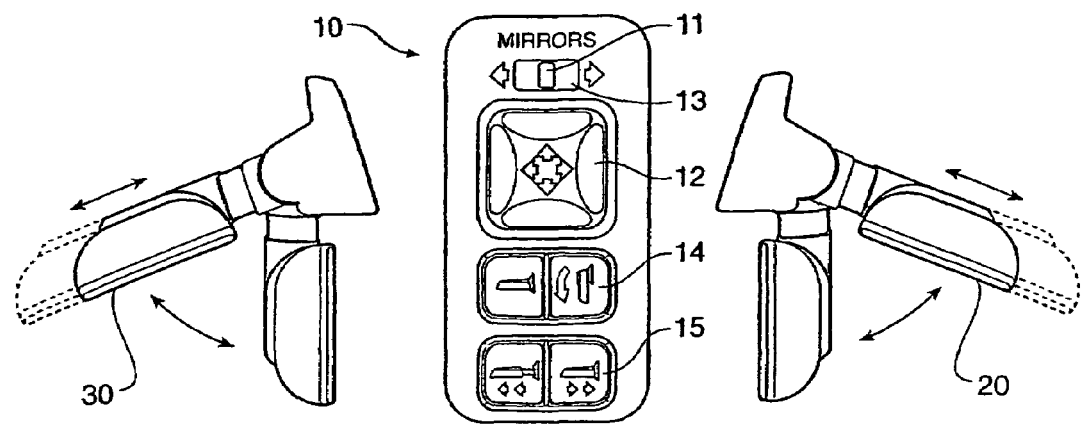
FIG. 2 shows a switch arrangement according to the present invention for controlling the function of both mirrors simultaneously.

In FIG. 2, with switch 11 in the central position in selector switch bay 13, it is possible to control the orientation of both mirrors 20 and 30 simultaneously via operation switch 12, as well as causing both mirrors 20 and 30 to fold in and out simultaneously via power fold control switch 14 and also to cause both mirrors 20 and 30 to telescope simultaneously via telescoping control switch 15.

The arrangement of the present invention allows the selecting function of selector switch 11 to be extended to the function operator switches 14 and 15 to allow the powerfold and telescoping functions to be applied to both mirrors, as is currently the case, or each mirror individually, without requiring any additional parts or re-arrangement of the switch arrangement. Mirror 20 can then be controlled independently of mirror 30 by placing switch 11 to the right hand side of selector switch bay 13 and performing the required operations using switches 12, 14 and 15 as described above (see FIG. 3). Mirror 30 is left unaffected by any of the control signals. Once mirror 20 has been appropriately adjusted, whether it be for orientation, powerfold or telescoping, switch 11 may then be switched to the left hand side of selector switch bay 13 (FIG. 4) to select left hand mirror 30. The position of mirror 30 is then adjusted in accordance with any of the control switches 12, 14 and 15 as required, leaving mirror 20 unaffected by these control signals.

When switch 11 is in the centre of switch bay 13, both mirrors are selected simultaneously, such that any function operation is conducted on both mirrors simultaneously. Of course, in practice, it is unlikely that the mirror orientation function would be required for both mirrors simultaneously, as each mirror will need to be adjusted individually in accordance with their relative positions to the driver. In this case, the neutral (ie lock out of both mirrors) function could be retained for the mirror orientation function switch 12.

Figure 5:
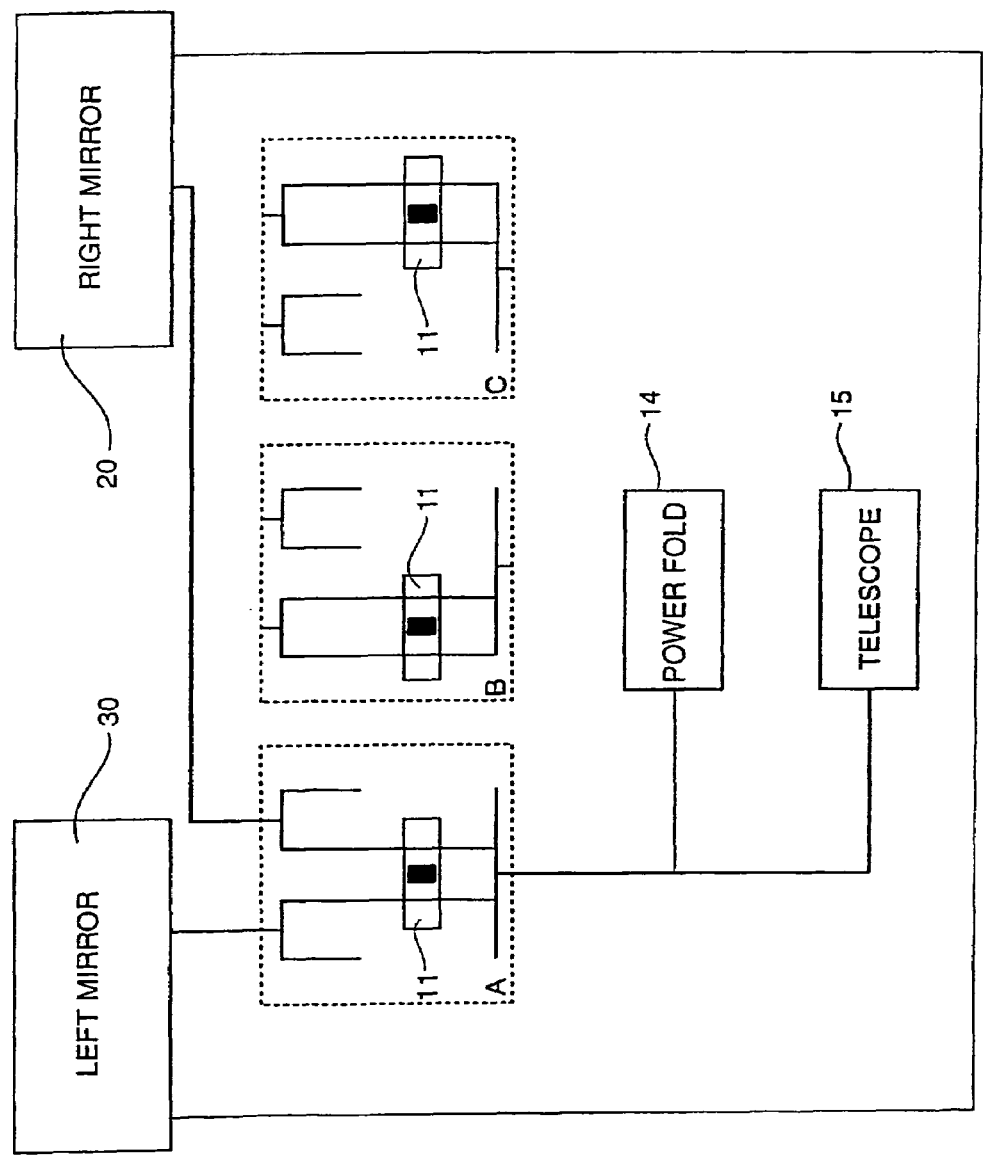
FIG. 5 shows a simplified exemplary schematic for a switch arrangement according to the present invention.

FIG. 5 shows a simplified circuit arrangement for the present invention, showing the three possible states A, B and C of selector switch 11.

In situation A, switch 11 connects operator switches 14 and 15 to both left and right hand mirrors 30 and 20. Upon actuation of either switch 14 or 15, that function will be applied to both mirrors 30 and 20 simultaneously. This is the traditionally "neutral" position of switch 11.

In situation B, switch 11 is moved to the left, and connects operator switches 14 and 15 to the left hand mirror 30 and isolates right hand mirror 20. Up actuation of either switch 14 or 15, that function will be applied only to the left hand mirror 30, and not to the right hand mirror 20.

In situation C, switch 11 is moved to the right, and connects operator switches 14 and 15 to right hand mirror 20. Upon actuation of her switch 14 or 15, that function will be applied to right hand mirror 20, and not to left hand mirror 30.

In practice, operator switch 12 (not shown) for controlling mirror orientation will be connected to switch 11 in the conventional manner and have both mirrors locked out when switch 11 is in the "neutral" centre position (situation A).

The arrangement of the present invention provides the driver with much greater flexibility in positioning the mirrors as required in particular circumstances, while not requiring any additional switches over those currently provided. This results in reduced switch component costs, switch assembly time, assembly time to vehicle, and reduces wire harness complexity and overall cost.

While the above has been described with reference to a preferred embodiment, it will be understood by the person skilled in the art that many variations and modifications may be made within the scope of the present invention. For example, the particular functions of the mirror need not be restricted to orientation, powerfold or power telescope but may be extended to any other suitable function.

International Application No. PCT/AU02/00352 titled "Vehicle external mirror wiring integration" discloses a pivot assembly having contacts mounted on detent surfaces for transmission of power from the base to the head. These features and other features disclosed in PCT/AU02/00352 could be used with the present invention and the disclosure of PCT/AU02/00352 is herewith incorporated in its entirety into this specification.

International Application No. PCT/AU02/00353 titled "Eternal vehicle mirror having self-loading pivot and improved end stop" discloses a mirror assembly having a self-loading pivot mechanism wherein initial rotation of the mirror head with respect to the mirror base causes preloading of a spring. These features and other features disclosed could be used with the present invention and the disclosure of PCT/AU02/00353 is herewith incorporated in its entirety into this specification.

International Application No. PCT/AU00/00413 titled "Method of producing a plastic moulded part including a film covering" discloses a method of forming a moulding component comprising an outer thin film component with an adhered moulded shell. The method of that disclosure could be used to mould hollow form components that may be used with this invention (for instance for the shell of the head and base) and the disclosure of this application is incorporated herewith in its entirety.

International Application No. PCT/AU02/01004 titled "Foldable vehicle external mirror having auxiliary mirror" discloses a vehicle external mirror having an auxiliary mirror mounted to a distal side of the mirror head. The auxiliary mirror provides rear vision when the mirror head is in its folded position. This features and other features disclosed in PCT/AU02/01004 are/could be used with the present invention and the disclosure of PCT/AU02/01004 is herewith incorporated in its entirety into this specification.

International Application No. PCT/AU02/00906 titled "Mirror Heater" discloses an automatic heating control system and apparatus for heating the surface of a mirror to de-ice or de-fog the mirror. The heating process is imitated upon starting the vehicle engine, and is conducted in accordance with an actual measured temperature of the mirror. These features and other features disclosed in this document could be used with the present invention and the disclosure of PCT/AU02/00906 is hereby incorporated in its entirety in to this current specification.

It would also be possible to incorporate other cone with the mirror base (mounting bracket) and or mirror head. Such components include electronic sensors such as proximity sensors to determine if the vehicle is dose to an obstruction, sensors that sense external temper and humidity, and sensors incorporated with the car security system such as motion detectors. Other various electronic equipment may be incorporated into the mirror base (mounting bracket) such as lights used to light the area around the vehicle, or lights that may be controlled from within the vehicle that enable the light to be moved so as to provide directional lighting. Speakers and microphones used to communicate to people external of the vehicle may also be incorporated as well as antennas for various apparatus such as mobile phones, GPS devices and other radio communication devices. In addition, transmitters may be incorporated into the mounting bracket which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mirror base (mounting bracket) which are both forward and rearward looking which are designed to continuously record digital images and to store those images either on command or as a result of an accident or incident. Motion sensors including accelerometers can be used to determine the occurrence of an accident or incident so that images before and after the event are stored.

The claims defining the invention are as follows:

1. A switch arrangement comprising:
    a selector switch and at least one operation control switch, said operation control switch controlling the operation of at least two external vehicle mirrors;
    said selector switch can assume at least three states, where in a first state, one of said at least two external vehicle mirrors is controlled by said operation control switch, in a second state another of said at least two external vehicle mirrors is controlled by said operation control switch, and in a third state, all of said at least two external vehicle mirrors are controlled by said operation control switch;
    said at least one operation control switch controls a powerfold function of said at least two vehicle external vehicle mirrors in said at least three states; and
    said at least one operation control switch controls an orientation function of said at least two vehicle external vehicle mirrors in said at least three states.

2. A switch arrangement according to claim 1 wherein said at least two external vehicle mirrors, are disposed on opposite sides of a vehicle.

3. A switch arrangement according to claim 1, wherein said at least one operation control switch controls a power telescope function of said at least two external vehicle mirrors in said at least three states.

4. The method according to claim 1, wherein a mirror orientation control switch is included, but is locked out in the third state.

5. A switch arrangement according to claim 1, wherein there are two power control switches, one controlling a power telescope function of the mirrors and the other controlling a powerfold function of the mirrors.

6. A method of extending the functionality of a traditional vehicle mirror control switch arrangement comprising:
    a mirror selector switch capable of assuming at least three states, the first state selecting a first mirror, the second state selecting a second mirror and a third (neutral state) not selecting either mirror, said method including operationally connecting at least one operation control switch to the selector switch and replacing the neutral state with the function of selecting all mirrors;
    said at least one operation control switch controls a powerfold function of said at least two vehicle external vehicle mirrors in said at least three states; and
    said at least one operation control switch controls an orientation function of said at least two vehicle external vehicle mirrors in said at least three states.

7. The method according to claim 6 wherein the at least one operation control switch is a power telescope control switch.

8. The method according to claim 7 wherein a mirror orientation control switch is included, but is locked out in the third state.

9. The method according to claim 6 wherein there are two operation control switches, one of which controls a powerfold function and the other of which controls a power telescope function.

10. The method according to claim 9 wherein a mirror orientation control switch is included, but is locked out in the third state.

11. The method according to claim 6 wherein a mirror orientation control switch is included, but is locked out in the third state.

* * * * *